US011919166B2

(12) United States Patent
Shao et al.

(10) Patent No.: US 11,919,166 B2
(45) Date of Patent: Mar. 5, 2024

(54) INDUSTRIAL INTERNET OF THINGS FOR MONITORING COLLABORATIVE ROBOTS AND CONTROL METHODS, STORAGE MEDIA THEREOF

(71) Applicant: CHENGDU QINCHUAN IOT TECHNOLOGY CO., LTD., Sichuan (CN)

(72) Inventors: Zehua Shao, Chengdu (CN); Yong Li, Chengdu (CN); Junyan Zhou, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 18/332,833

(22) Filed: Jun. 12, 2023

(65) Prior Publication Data

US 2023/0311313 A1 Oct. 5, 2023

(30) Foreign Application Priority Data

Feb. 7, 2023 (CN) ......................... 202310070911.0

(51) Int. Cl.
*B25J 9/16* (2006.01)

(52) U.S. Cl.
CPC ............. *B25J 9/163* (2013.01); *B25J 9/1697* (2013.01)

(58) Field of Classification Search
CPC ........... B25J 9/163; B25J 9/1697; Y02P 90/02
See application file for complete search history.

(56) References Cited

U.S. PATENT DOCUMENTS

2008/0154428 A1* 6/2008 Nagatsuka ............. B25J 9/1656 700/258
2013/0238128 A1* 9/2013 Suzuki .................. B25J 9/1697 700/258
2019/0105779 A1* 4/2019 Einav .................... B25J 9/1689
(Continued)

FOREIGN PATENT DOCUMENTS

CN 107363833 A 11/2017
CN 107390636 A 11/2017
(Continued)

OTHER PUBLICATIONS

Xie, Yujian, Research and Development of Internet of Things Monitoring System for HRT-120 Industrial Robot Based on Niagara, China Master's Theses Full-text Database Information Technology Series, 2021, 74 pages.

*Primary Examiner* — Ryan Rink
(74) *Attorney, Agent, or Firm* — Runzhi Lai

(57) ABSTRACT

The present disclosure provides an industrial Internet of things for monitoring a collaborative robot and a control method, a storage medium thereof, wherein the control method comprises: obtaining position data of the workpiece to be processed as first monitoring data through the sensing network platform; selecting, based on the first monitoring data, a benchmark working parameter matching the first monitoring data from a working parameter library; obtaining, via the sensing network platform, a working parameter of the target collaborative robot as second monitoring data; comparing the second monitoring data with the benchmark working parameter to determine a working state of the target collaborative robot.

8 Claims, 6 Drawing Sheets

(56) References Cited

U.S. PATENT DOCUMENTS

| | | | | |
|---|---|---|---|---|
| 2020/0133254 | A1 | 4/2020 | Cella et al. | |
| 2021/0118086 | A1 | 4/2021 | Lee et al. | |
| 2023/0150777 | A1* | 5/2023 | Skyum | B07C 5/02<br>700/245 |
| 2023/0162213 | A1* | 5/2023 | Huang | G06Q 30/0202<br>705/7.31 |

FOREIGN PATENT DOCUMENTS

| | | | |
|---|---|---|---|
| CN | 108647267 | A | 10/2018 |
| CN | 109191513 | A | 1/2019 |
| CN | 110421594 | A | 11/2019 |
| CN | 111702760 | A | 9/2020 |
| CN | 113232019 | A | 8/2021 |
| CN | 114026508 | A | 2/2022 |
| CN | 114371632 | A | 4/2022 |
| CN | 114741454 | A | 7/2022 |
| CN | 115065708 | A | 9/2022 |
| DE | 102018118265 | A1 | 1/2020 |
| JP | 2005222258 | A | 8/2005 |

* cited by examiner

Figure 2:
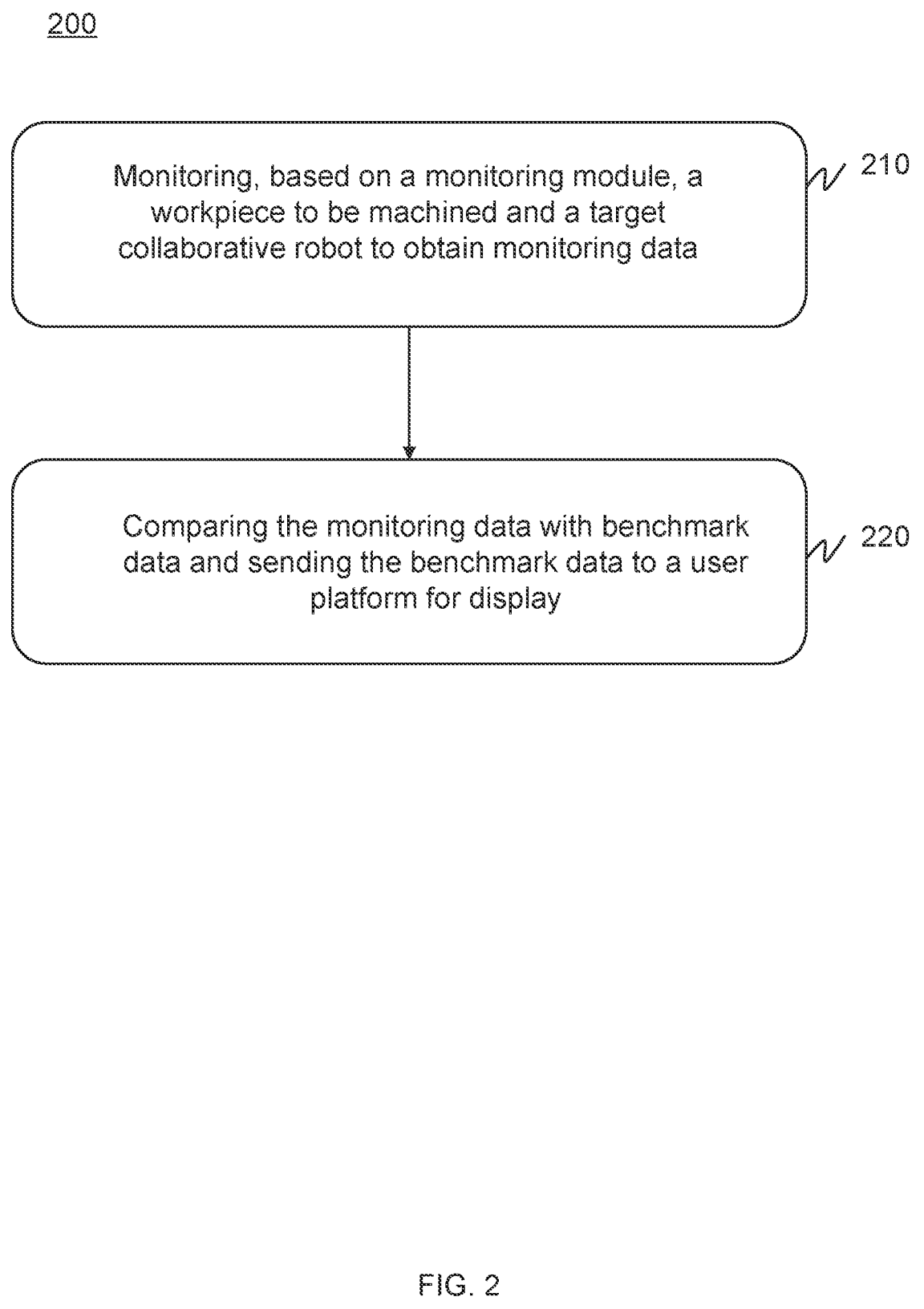

200

Monitoring, based on a monitoring module, a workpiece to be machined and a target collaborative robot to obtain monitoring data

210

Comparing the monitoring data with benchmark data and sending the benchmark data to a user platform for display

INDUSTRIAL INTERNET OF THINGS FOR MONITORING COLLABORATIVE ROBOTS AND CONTROL METHODS, STORAGE MEDIA THEREOF

CROSS-REFERENCE TO RELATED APPLICATIONS

This application claims priority of Chinese Patent Application No. 202310070911.0, filed on Feb. 7, 2023, the contents of which are hereby incorporated by reference to its entirety.

TECHNICAL FIELD

The present disclosure relates to an industrial Internet of Things for monitoring a collaborative robot and a control method, storage medium thereof.

BACKGROUND

The collaborative robot, is that the robot and human can work together on the production line, giving full play to the efficiency of the robot and human intelligence. Such robot is not only cost-effective, but also safe and convenient, and can greatly promote the development of manufacturing enterprises collaborative robot as a new type of industrial robot, sweeping away the barriers to human-robot collaboration, allowing the robot to completely get rid of the fence or cage, and its pioneering product performance and wide range of applications, opening up a new era for the development of industrial robots.

In the environment of human-robot collaboration, in order to improve the tolerance of the target pendulum for collaborative robot work and reduce the costs associated with the workpiece position adjustment process, machine vision technology has been used to locate and identify the workpiece and process it directly by the collaborative robot without adjusting the workpiece position. Although this can effectively reduce production costs, the parameters generated by each collaborative robot operation are different because the workpiece placement position is not fixed each time, making it difficult to analyze the working state of the collaborative robot for implementation.

SUMMARY

In order to overcome at least the aforementioned deficiencies in the prior art, it is an object of the present disclosure to provide an industrial Internet of things for monitoring a collaborative robot and a control method, storage medium thereof.

In a first aspect, one or more embodiments of the present disclosure provide an industrial Internet of things for monitoring a collaborative robot, wherein the industrial Internet of things comprises: a monitoring module and a comparison module; the monitoring module being used to monitor a workpiece to be machined and a target collaborative robot to obtain monitoring data; and the comparison module being used to compare the monitoring data with benchmark data and send the benchmark data to a user platform for display.

In some embodiments, embodiments of the present disclosure provide an industrial Internet of Things for monitoring a collaborative robot, including a service platform, a management platform and a sensing network platform connected in sequence, wherein the monitoring module is performed by the sensing network platform and the comparison module is performed by the management platform and the service platform, the management platform includes:

- a first acquisition unit configured to obtain position data of the workpiece to be machined as first monitoring data through the sensing network platform; the first monitoring data being obtained through a machine vision recognition device configured to the target collaborative robot;
- a matching unit configured to select, based on the first monitoring data, a benchmark working parameter matching the first monitoring data from a working parameter library;
- a second acquisition unit configured to obtain, via the sensing network platform, a working parameter of the target collaborative robot as second monitoring data when the target collaborative robot is machining the workpiece to be machined;
- a comparison unit configured to compare the second monitoring data with the benchmark working parameter to determine a working state of the target collaborative robot;
- a communication module configured to send the first monitoring data, the second monitoring data, the benchmark working parameter and the working state of the target collaborative robot to the user platform via the service platform for displaying to a user.

In order to overcome the problems in the prior art, the embodiments of the present disclosure are implemented by obtaining the first monitoring data through the machine vision recognition device configured in the target collaborative robot in the prior art, and the position data of the workpiece to be machined as described herein may be a coordinate position of a specific point of the workpiece to be machined taken, or it may be the coordinate data of the enclosed region, and the embodiments of the present disclosure are not more limited here. When the position of the workpiece to be machined is different, the first monitoring data may differ. Therefore, in order to circumvent this difference, the embodiments of the present disclosure select a benchmark working parameter matching the first monitoring data from the working parameter library through the matching unit, and the benchmark working parameter is a benchmark that should appear in the target collaborative robot when the position data of the workpiece to be machined is in the first monitoring data in a normal working condition.

In the embodiments of the present disclosure, in order to monitor the target collaborative robot, it is also necessary to obtain a working parameters of the target collaborative robot while performing machining as the second monitoring data, i.e., a parameter of its operation, such as a torque, an angle, etc., of a certain joint motor output, through the second acquisition unit. The second acquisition unit and the first acquisition unit may use the same software and hardware, or may use different software and hardware devices, and the embodiments of the present disclosure are not limited here. Through the comparison of the second monitoring data and the benchmark working parameter, both the working state of the target collaborative robot may be determined, and its determination means generally adopts a commonly used loss model for evaluation. By positioning and identifying the workpiece to be machined by the target collaborative robot and selecting the benchmark work parameter to match it, the embodiments of the present disclosure realize that the working state of the target collaborative robot may be monitored at different placement positions of the workpiece to be machined, which is conducive to saving the position adjustment process of the workpiece to be machined and reducing the cost of the production line.

In one possible implementation, the working parameter library is configured with a correspondence of different monitoring data regions and benchmark working parameters;

the matching unit is further configured to:

traverse all the monitoring data regions in the working parameter library and select a monitoring data region where the first monitoring data is located;

use the benchmark working parameter corresponding to the selected monitoring data region as a benchmark working parameter matching the first monitoring data.

In one possible implementation, the comparison unit is further configured to:

calculate a residual allowable value based on a position of the first monitoring data in a corresponding monitoring data region, and generate a loss function based on the residual allowable value;

compare the second monitoring data with the benchmark working parameter according to the loss function.

In one possible implementation, the first monitoring data is a coordinate position of a key region of a workpiece to be machined in a reference coordinate system; the reference coordinate system is a coordinate system established within a field of view of a camera of the machine vision recognition device; the monitoring data region is a working parameter having a similarity above a preset value for the target collaborative robot to process the corresponding workpiece to be machined when the first monitoring data falls into the same monitoring data region; the benchmark working parameter is a working parameter for the target collaborative robot to process the corresponding workpiece to be machined in a normal state when the first monitoring data falls into a central region of the monitoring data region.

In one possible implementation, the comparison unit is further configured to:

obtain a first center coordinate value of the first monitoring data and obtain a second center coordinate value of the monitoring data region; the first center coordinate value being a coordinate of a center point of position data of the workpiece to be machined in the reference coordinate system; the second center coordinate value being a coordinate of a center point of a center region of the monitoring data region in the reference coordinate system;

calculate a physical distance between the first center coordinate value and the second center coordinate value and input the physical distance into a permissive residual model to generate the residual allowable value.

In one possible implementation, the service platform includes a service master platform and at least two service sub-platforms, different service sub-platforms being used to receive different types of data transmitted by the management platform; the service master platform aggregating the data collected by all the service sub-platforms and sending them to the user platform for presentation to the user;

the management platform includes multiple mutually independent management sub-platforms, the first acquisition unit, the matching unit, the second acquisition unit, the comparison unit and the communication module being configured in the same management sub-platform;

the sensing network platform includes a sensing network master platform and at least two sensing network sub-platforms, different sensing network sub-platforms being used to receive different types of data on a production line; the sensing network master platform aggregating the data collected by all the sensing network sub-platforms and sending them to the management platform.

In some embodiments, the industrial Internet of Things for monitoring a collaborative robot is used for the finishing of a precision part, and the comparison module is further used to: obtain position information and a morphological feature of the precision part through the machine vision recognition device of the target collaborative robot; determine, based on the position information and the morphological feature, a benchmark working parameter for the finishing of the precision part by the target collaborative robot; obtain a specificity feature of the precision part; determine, based on the specificity feature, a dynamic working parameter and send the benchmark working parameter and the dynamic working parameter to the user platform for display.

In some embodiments, the comparison module is further used to: determine, based on the position information and the morphological feature of the precision part, a working process and a working position in which the precision part is located; determine the benchmark working parameter libraryd on at least one of a precision requirement of the precision part, a material, the working process in which the precision part is located, the working position and a device feature of a machining device, the benchmark working parameter including at least one of a machining intensity and a machining time.

In some embodiments, the specificity feature includes precision parameter distribution information after a previous process, the dynamic working parameter includes at least dynamic machining time length; the comparison module is further used to: determine a specificity machining point position based on the precision parameter distribution information after the previous process of the precision part and a reference precision of the previous process; determine the dynamic machining time length through a precision prediction model based on a precision parameter of the specificity machining point position, the precision prediction model being a machine learning model.

In a second aspect, embodiments of the present disclosure provide an industrial Internet of Things control method for monitoring a collaborative robot, wherein the method is executed based on a management platform for an industrial Internet of Things for monitoring a collaborative robot;

The method comprises: monitor, based on a monitoring module, a workpiece to be machined and a target collaborative robot to obtain monitoring data; and compare the monitoring data with benchmark data and send the benchmark data to a user platform for display.

In some embodiments, the control method further includes:

obtaining position data of the workpiece to be machined as first monitoring data through the sensing network platform; the first monitoring data being obtained through a machine vision recognition device configured to the target collaborative robot;

selecting, based on the first monitoring data, a benchmark working parameter matching the first monitoring data from a working parameter library;

obtaining, via the sensing network platform, a working parameter of the target collaborative robot as second monitoring data when the target collaborative robot is machining the workpiece to be machined;

comparing the second monitoring data with the benchmark working parameter to determine a working state of the target collaborative robot;

sending the first monitoring data, the second monitoring data, the benchmark working parameter and the working state of the target collaborative robot to the user platform via the service platform for displaying to a user.

In one possible implementation, the working parameter library is configured with a correspondence of different monitoring data regions and benchmark working parameters;

the selecting, based on the first monitoring data, a benchmark working parameter matching the first monitoring data from a working parameter library includes:

traversing all the monitoring data regions in the working parameter library and selecting a monitoring data region where the first monitoring data is located;

using the benchmark working parameter corresponding to the selected monitoring data region as a benchmark working parameter matching the first monitoring data.

In one possible implementation, the comparing the second monitoring data with the benchmark working parameter to determine a working state of the target collaborative robot includes:

calculating a residual allowable value based on a position of the first monitoring data in a corresponding monitoring data region, and generating a loss function based on the residual allowable value;

comparing the second monitoring data with the benchmark working parameter according to the loss function.

In one possible implementation, the first monitoring data is a coordinate position of a key region of a workpiece to be machined in a reference coordinate system; the reference coordinate system is a coordinate system established within a field of view of a camera of the machine vision recognition device; the monitoring data region is a working parameter having a similarity above a preset value for the target collaborative robot to process the corresponding workpiece to be machined when the first monitoring data falls into the same monitoring data region; the benchmark working parameter is a working parameter for the target collaborative robot to process the corresponding workpiece to be machined in a normal state when the first monitoring data falls into a central region of the monitoring data region.

In some embodiments, the industrial Internet of Things control method for monitoring a collaborative robot further includes: obtaining a first center coordinate value of the first monitoring data and obtain a second center coordinate value of the monitoring data region; the first center coordinate value being a coordinate of a center point of position data of the workpiece to be machined in the reference coordinate system; the second center coordinate value being a coordinate of a center point of a center region of the monitoring data region in the reference coordinate system; calculating a physical distance between the first center coordinate value and the second center coordinate value and input the physical distance into a permissive residual model to generate the residual allowable value.

In some embodiments, the control method further includes: obtaining position information and a morphological feature of the precision part through the machine vision recognition device of the target collaborative robot; determining, based on the position information and the morphological feature, a benchmark working parameter for the finishing of the precision part by the target collaborative robot; obtaining a specificity feature of the precision part; determining, based on the specificity feature, a dynamic working parameter and send the benchmark working parameter and the dynamic working parameter to the user platform for display.

In some embodiments, the determining, based on the position information and the morphological feature, a benchmark working parameter for the finishing of the precision part by the target collaborative robot includes: determining, based on the position information and the morphological feature of the precision part, a working process and a working position in which the precision part is located; determining the benchmark working parameter libraryd on at least one of a precision requirement of the precision part, a material, the working process in which the precision part is located, the working position and a device feature of a machining device, the benchmark working parameter including at least one of a machining intensity and a machining time.

In some embodiments, the specificity feature includes precision parameter distribution information after a previous process, the dynamic working parameter includes at least dynamic machining time length, the determining the dynamic working parameter libraryd on the specificity feature includes: determining a specificity machining point position based on the precision parameter distribution information after the previous process of the precision part and a reference precision of the previous process; determining the dynamic machining time length through a precision prediction model based on a precision parameter of the specificity machining point position, the precision prediction model being a machine learning model.

One or more embodiments of the present disclosure provide a non-transitory computer-readable storage medium, comprising a set of instructions, wherein when executed by a processor, an industrial Internet of Things control method for monitoring a collaborative robot as described above is implemented.

The present disclosure has the following advantages and beneficial effects over the prior art:

The industrial Internet of things for monitoring a collaborative robot and the control method and storage medium thereof of the present disclosure, by positioning and identifying a workpiece to be machined by a target collaborative robot and selecting a benchmark work parameter to match it, enables monitoring of a working state of the target collaborative robot at different placement positions of the workpiece to be machined, which is conducive to saving the position adjustment process of the workpiece to be machined and reducing the cost of the production line.

BRIEF DESCRIPTION OF THE DRAWINGS

The present disclosure is further illustrated in terms of exemplary embodiments. These exemplary embodiments are described in detail with reference to the drawings. These embodiments are not limited. In these embodiments, the same number represents the same structure, wherein:

FIG. 2 is a flowchart illustrating an exemplary industrial Internet of Things control method for monitoring a collaborative robot, according to some embodiments of the present disclosure;

DETAILED DESCRIPTION

Figure 1:
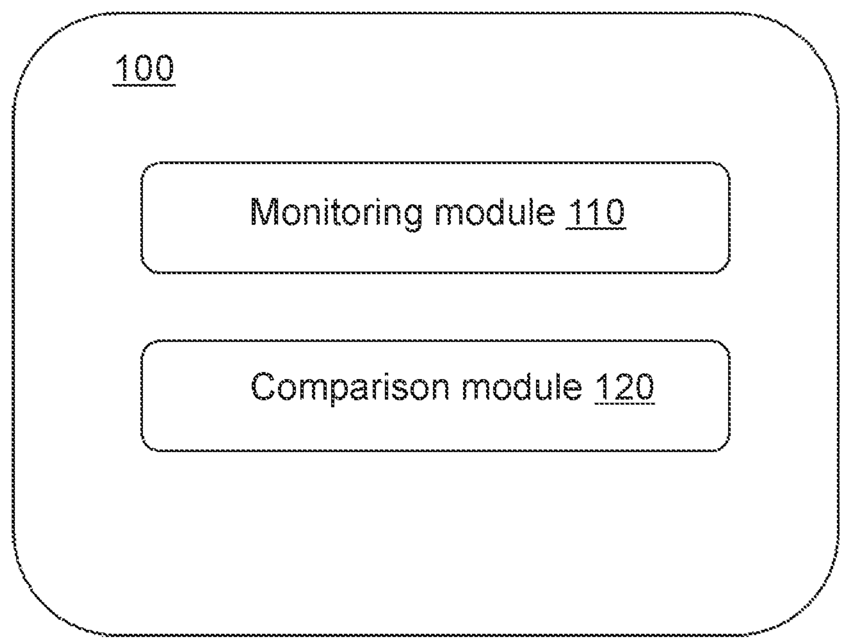
FIG. 1 is a diagram illustrating an exemplary module for an industrial Internet of Things for monitoring a collaborative robot, according to some embodiments of the present disclosure.

The technical schemes of embodiments of the present disclosure will be more clearly described below, and the accompanying drawings need to be configured in the description of the embodiments will be briefly described below. Obviously, the drawings in the following description are merely some examples or embodiments of the present disclosure, and will be applied to other similar scenarios according to these accompanying drawings without paying creative labor. Unless obviously obtained from the context or the context illustrates otherwise, the same numeral in the drawings refers to the same structure or operation.

It should be understood that the “system”, “device”, “unit” and/or “module” used herein is a method for distinguishing different components, elements, components, parts or assemblies of different levels. However, if other words may achieve the same purpose, the words may be replaced by other expressions.

As shown in the present disclosure and claims, unless the context clearly prompts the exception, “a”, “one”, and/or “the” is not specifically singular, and the plural may be included. It will be further understood that the terms “comprise,” “comprises,” and/or “comprising,” “include,” “includes,” and/or “including,” when used in present disclosure, specify the presence of stated features, integers, steps, operations, elements, and/or components, but do not preclude the presence or addition of one or more other features, integers, steps, operations, elements, components, and/or groups thereof.

The flowcharts are used in present disclosure to illustrate the operations performed by the system according to the embodiment of the present disclosure. It should be understood that the preceding or following operations is not necessarily performed in order to accurately. Instead, the operations may be processed in reverse order or simultaneously. Moreover, one or more other operations may be added to the flowcharts. One or more operations may be removed from the flowcharts.

FIG. 1 is a diagram illustrating an exemplary module for an industrial Internet of Things for monitoring a collaborative robot, according to some embodiments of the present disclosure. As shown in FIG. 1, an industrial Internet of Things 100 for monitoring a collaborative robot may include a monitoring module 110 and a comparison module 120.

In some embodiments, the monitoring module 110 may be used to monitor a workpiece to be machined and a target collaborative robot to obtain monitoring data. For more information about the obtaining monitoring data, please refer to step 210 and its related description.

In some embodiments, the monitoring module 110 may be performed by a sensing network platform. For more information about the sensing network platform, please refer to FIG. 3 and its related description.

In some embodiments, the comparison module 120 may be used to compare the monitoring data to benchmark data and send it to a user platform for display. For more information about the comparing the monitoring data to the benchmark data, please refer to step 220 and its related description.

In some embodiments, the comparison module 120 may be further used to obtain position information and a morphological feature of the precision part through the machine vision recognition device of the target collaborative robot; determine, based on the position information and the morphological feature, a benchmark working parameter for the finishing of the precision part by the target collaborative robot; obtain a specificity feature of the precision part; determine, based on the specificity feature, a dynamic working parameter and send the benchmark working parameter and the dynamic working parameter to the user platform for display. For more information about the position information and morphological feature, the benchmark working parameter, the specificity feature, and the dynamic working parameter of the precision part, please refer to FIG. 5 and its related description.

In some embodiments, the comparison module 120 may be further used to determine, based on the position information and the morphological feature of the precision part, a working process and a working position in which the precision part is located; determine the benchmark working parameter based on at least one of a precision requirement of the precision part, a material, the working process in which the precision part is located, the working position and a device feature of a machining device, the benchmark working parameter including at least one of a machining intensity and a machining time. For more information about the precision requirement of the precision part, the material, the working process, the working station in which it is located and the device feature of the machining device, the machining intensity and the machining time, please refer to FIG. 5 and its related description.

In some embodiments, the comparison module 120 may be further used to determine a specificity machining point position based on the precision parameter distribution information after the previous process of the precision part and a reference precision of the previous process; determine the dynamic machining time length through a precision prediction model based on a precision parameter of the specificity machining point position, the precision prediction model being a machine learning model. For more information about the precision parameter distribution, the reference precision, the specificity machining point position, and the dynamic machining time length, please refer to FIG. 5 and its related description, and for more information about the precision prediction model, please refer to FIG. 6 and its related description.

In some embodiments, the comparison module 120 may be performed by a management platform and a service platform. For more information about the management platform and the service platform, please refer to FIG. 3 and its related description.

It should be noted that the above description of the industrial Internet of Things for monitoring a collaborative robot and its modules is for descriptive convenience only and does not limit the present disclosure to the scope of the embodiments cited. It can be understood that it is possible for those skilled in the art, with an understanding of the principle of the system, to make any combination of the modules or to form subsystems to connect to other modules without departing from this principle. In some embodiments, the monitoring module 110 and the comparison module 120 disclosed in FIG. 1 may be different modules in a single system, or one module may implement the functions of two or more of the modules described above. For example, the modules may share a common memory module, and each module may also have its own memory module. Variations such as these are within the scope of protection of the present disclosure.

FIG. 2 is a flowchart illustrating an exemplary control method for an industrial Internet of Things of monitoring a collaborative robot, according to some embodiments of the present disclosure. In some embodiments, process 200 may be performed by the management platform of the industrial Internet of Things for monitoring a collaborative robot. As shown in FIG. 2, process 200 includes the following steps.

Step 210, monitoring, based on a monitoring module, a workpiece to be machined and a target collaborative robot to obtain monitoring data. For more information about the monitoring module, please refer to FIG. 1 and its related description.

The workpiece to be machined is a workpiece to be machined. For example, the workpiece to be machined may include, but is not limited to, a gear, a nut, etc. to be machined.

The target collaborative robot is a robot that is used to work in concert with a human. For example, the target collaborative robot may include, but is not limited to, a single-arm collaborative robot, a two-arm collaborative robot, etc.

The monitoring data is data related to the machining of the workpiece to be machined. For example, the monitoring data may include, but is not limited to, position data of the workpiece to be machined, a working parameter of the target collaborative robot, etc. For more information about the position data and the working parameter, please refer to FIG. 3 and its related description.

In some embodiments, the monitoring module 110 may obtain the monitoring data in a variety of ways. For example, the monitoring module may obtain the position data of the workpiece to be machined by photographing the workpiece to be machined based on a machine vision recognition device of the target collaborative robot. As another example, the monitoring module may obtain the working parameter by accessing a storage device of the target collaborative robot.

Step 220, comparing the monitoring data with benchmark data and sending the benchmark data to a user platform for display. For more information about the user platform, please refer to FIG. 3 and its related description.

The benchmark data is data that is used for reference. For example, the benchmark data may include, but is not limited to, a benchmark working parameter, etc. For more information about the benchmark working parameter, please refer to FIG. 3 and its related description.

In some embodiments, the comparison module 120 may compare the monitoring data to the benchmark data in a variety of ways. For example, the comparison module 120 may mark data where a difference between the monitoring data and the benchmark data is greater than a comparison difference threshold. The marking may be done in a variety of ways, for example, using different colors for marking. The comparison difference threshold may be an empirical value, a default value, an advance preset value, etc., or any combination thereof, without limitation herein.

In some embodiments of the present disclosure, the obtained monitoring data is compared with the benchmark data and sent to the user platform for display, which allows the user to grasp a working state of the target collaborative robot in real time and make a real-time adjustment to the working parameter of the target collaborative robot.

It should be noted that the above description of process 200 is intended to be exemplary and illustrative only, and does not limit the scope of application of the present disclosure. For those skilled in the art, various amendments and changes can be made to process 200 under the guidance of the present disclosure. However, these amendments and changes remain within the scope of the present disclosure.

Figure 3:
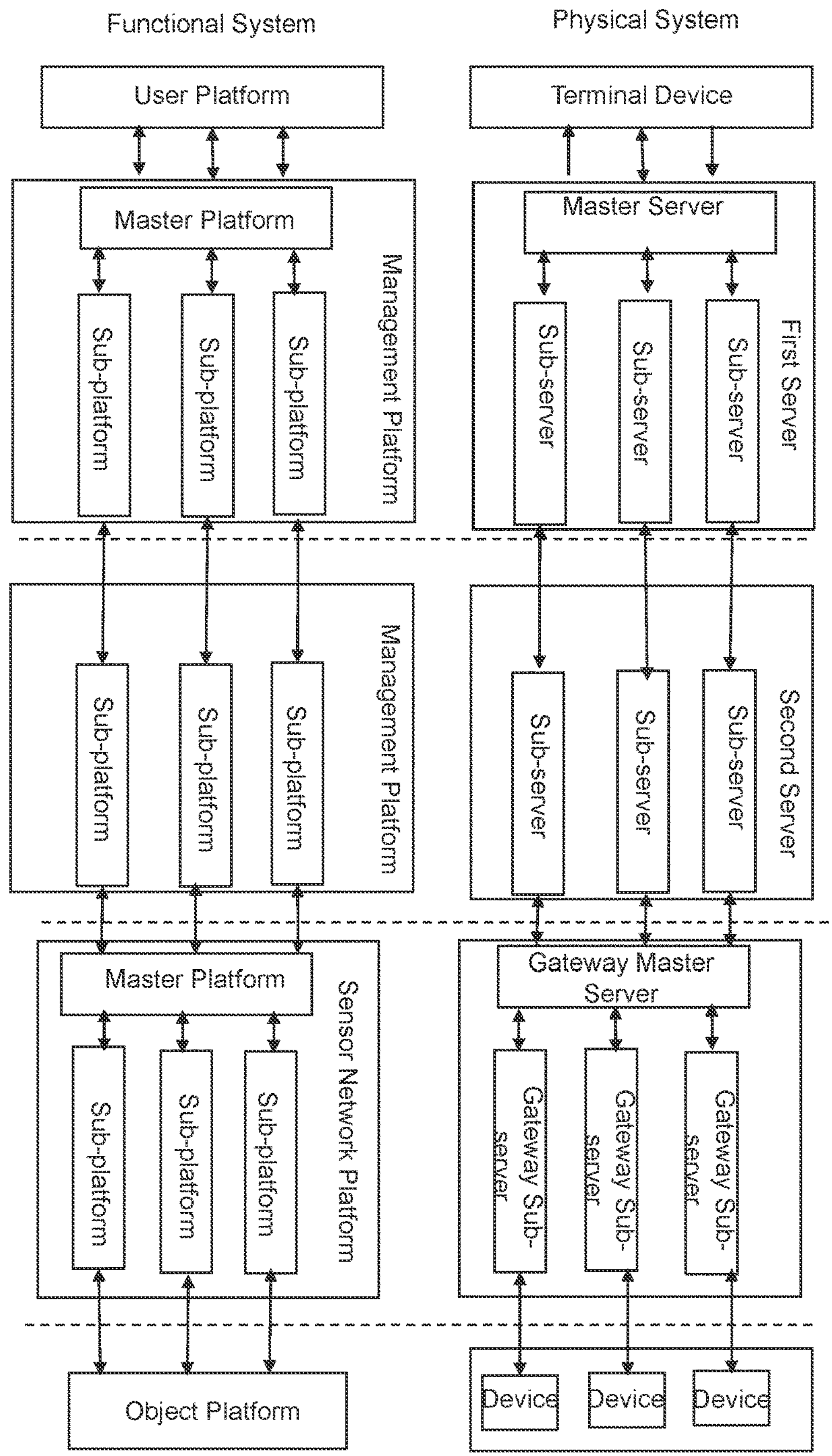
FIG. 3 is a diagram illustrating an exemplary structure of the industrial Internet of Things for monitoring a collaborative robot, according to some embodiments of the present disclosure.

FIG. 3 is a diagram illustrating an exemplary structure of the industrial Internet of Things for monitoring a collaborative robot, according to some embodiments of the present disclosure. As shown in FIG. 3, the industrial Internet of Things for monitoring a collaborative robot includes a user platform, a service platform, a management platform, a sensing network platform and an object platform connected in sequence, the object platform being configured for different devices on a production line, such as a machine vision recognition device, the management platform includes:

a first acquisition unit configured to obtain position data of the workpiece to be machined as first monitoring data through the sensing network platform; the first monitoring data being obtained through a machine vision recognition device configured to the target collaborative robot;

a matching unit configured to select, based on the first monitoring data, a benchmark working parameter matching the first monitoring data from a working parameter library;

a second acquisition unit configured to obtain, via the sensing network platform, a working parameter of the target collaborative robot as second monitoring data when the target collaborative robot is machining the workpiece to be machined;

a comparison unit configured to compare the second monitoring data with the benchmark working parameter to determine a working state of the target collaborative robot;

a communication module configured to send the first monitoring data, the second monitoring data, the benchmark working parameter and the working state of the target collaborative robot to the user platform via the service platform for displaying to a user.

In order to overcome the problems in the prior art, the embodiments of the present disclosure are implemented by obtaining the first monitoring data through the machine vision recognition device configured in the target collaborative robot in the prior art, and the position data of the workpiece to be machined as described herein may be a coordinate position of a specific point of the workpiece to be machined taken, or it may be the coordinate data of the enclosed region, and the embodiments of the present disclosure are not more limited here. When the position of the workpiece to be machined is different, the first monitoring data may differ. Therefore, in order to circumvent this difference, the embodiments of the present disclosure select a benchmark working parameter matching the first monitoring data from the working parameter library through the matching unit, and the benchmark working parameter is a benchmark that should appear in the target collaborative robot when the position data of the workpiece to be machined is in the first monitoring data in a normal working condition.

In the embodiments of the present disclosure, in order to monitor the target collaborative robot, it is also necessary to obtain a working parameters of the target collaborative robot while performing machining as the second monitoring data, i.e., a parameter of its operation, such as a torque, an angle, etc., of a certain joint motor output, through the second acquisition unit. The second acquisition unit and the first acquisition unit may use the same software and hardware, or may use different software and hardware devices, and the embodiments of the present disclosure are not limited here. Through the comparison of the second monitoring data and the benchmark working parameter, both the working state of the target collaborative robot may be determined, and its determination means generally adopts a commonly used loss model for evaluation. By positioning and identifying the workpiece to be machined by the target collaborative robot and selecting the benchmark work parameter to match it, the embodiments of the present disclosure realize that the working state of the target collaborative robot may be monitored at different placement positions of the workpiece to be machined, which is conducive to saving the position adjustment process of the workpiece to be machined and reducing the cost of the production line.

In one possible implementation, the working parameter library is configured with a correspondence of different monitoring data regions and benchmark working parameters;

the matching unit is further configured to:

traverse all the monitoring data regions in the working parameter library and select a monitoring data region where the first monitoring data is located;

use the benchmark working parameter corresponding to the selected monitoring data region as a benchmark working parameter matching the first monitoring data.

When the embodiments of the present disclosure are implemented, the inventor finds that for if the placement of the workpiece to be machined is randomly large, the situation of the possible first monitoring data may be more complex, and the number of possible first monitoring data may be very large, which is not conducive to the retrieval of the corresponding benchmark working parameter. Therefore, in the embodiments of the present disclosure, multiple monitoring data regions are delineated, and when the first monitoring data is a surface, the monitoring data region is larger than the region of the first monitoring data. Each monitoring data region corresponds to a different benchmark working parameter, and when the benchmark working parameter is retrieved by the first monitoring data, the benchmark working parameter corresponding to the monitoring data region containing current first monitoring data is taken as the selected benchmark working parameter, which can effectively improve the efficiency of traversal retrieval and has a great improvement for the production line efficiency.

In one possible implementation, the comparison unit is further configured to:

calculate a residual allowable value based on a position of the first monitoring data in a corresponding monitoring data region, and generate a loss function based on the residual allowable value;

compare the second monitoring data with the benchmark working parameter according to the loss function.

When the embodiments of the present disclosure are implemented, the actual working parameters of the target collaborative robot corresponding to different positions in the same monitoring data region actually still differs to some extent, and this difference needs to meet the corresponding permissive requirements at the time of design. In the process of use, the residual allowable value may be calculated from the position of the first monitoring data in the monitoring data region, and the loss function is generated; when the second monitoring data is compared with the benchmark working parameter, only the difference between the second monitoring data and the benchmark working parameter needs to meet a certain condition, and the collaborative robot may be considered to be in a normal working state.

In one possible implementation, the first monitoring data is a coordinate position of a key region of a workpiece to be machined in a reference coordinate system; the reference coordinate system is a coordinate system established within a field of view of a camera of the machine vision recognition device; the monitoring data region is a working parameter having a similarity above a preset value for the target collaborative robot to process the corresponding workpiece to be machined when the first monitoring data falls into the same monitoring data region; the benchmark working parameter is a working parameter for the target collaborative robot to process the corresponding workpiece to be machined in a normal state when the first monitoring data falls into a central region of the monitoring data region.

When the embodiments of the present disclosure are implemented, the key region may be a boundary or a vertex of the workpiece to be machined and other regions that can characterize a space occupied by the workpiece to be machined, wherein the first monitoring data may be a pixel point coordinate or a region coordinate; exemplarily, when the first monitoring data is a coordinate of a quadrilateral, four vertex coordinates of the quadrilateral are used as the first monitoring data; and the monitoring data region is adopted as a criterion that the working parameters of the target collaborative robot are very similar when the workpiece to be machined corresponding to the first monitoring data in the monitoring data region is machined, and the similarity degree (or similarity) may refer to the maximum range of the above-mentioned residual allowable value. When the first monitoring data is a region coordinate, whether a coordinate value of a center point of the region falls within the monitoring data region is generally used to determine whether the first monitoring data falls into the monitoring data region. At the same time, in order to provide an accurate reference value for the benchmark working parameter, a parameter that is normally machined for the corresponding workpiece to be machined when the first monitoring data is in the center region of the monitoring data region is taken as the benchmark working parameter; this is because generally in a uniform monitoring data region, the benchmark working parameter generated by the center point/center region is equivalent to the benchmark working parameter generated by the other regions in the monitoring data region, which effectively reduces the maximum range of residual allowable values. At the same time, it should be understood that in the embodiments of the present disclosure the case of rotation of the workpiece to be machined is not considered, and the workpiece to be machined exists only in one or two directions of axial displacement in the reference coordinate system.

In one possible implementation, the comparison unit is further configured to:

obtain a first center coordinate value of the first monitoring data and obtain a second center coordinate value of the monitoring data region; the first center coordinate value being a coordinate of a center point of position data of the workpiece to be machined in the reference coordinate system; the second center coordinate value being a coordinate of a center point of a center region of the monitoring data region in the reference coordinate system;

calculate a physical distance between the first center coordinate value and the second center coordinate value and input the physical distance into a permissive residual model to generate the residual allowable value.

When the embodiments of the present disclosure are implemented, a physical geometric distance between the first central coordinate value and the second central coordinate value is used as a criterion for calculating the residual allowable value in order to quickly go through the first monitoring data and the monitoring data region, i.e., the larger the physical geometric distance is, the larger the residual allowable value is, and the smaller the physical geometric distance is, the smaller the residual allowable value is. The corresponding allowable residual model is generally a monotonic model, which may be a linear model or a fitted model, etc. The embodiments of the present disclosure are not limited here. This is beneficial to the fast calculation of data on the production line and reduces the arithmetic power consumption.

In one possible implementation, the service platform includes a service master platform and at least two service sub-platforms, different service sub-platforms being used to receive different types of data transmitted by the management platform; the service master platform aggregating the data collected by all the service sub-platforms and sending them to the user platform for presentation to the user;

the management platform includes multiple mutually independent management sub-platforms, the first acquisition unit, the matching unit, the second acquisition unit, the comparison unit and the communication module being configured in the same management sub-platform;

the sensing network platform includes a sensing network master platform and at least two sensing network sub-platforms, different sensing network sub-platforms being used to receive different types of data on a production line; the sensing network master platform aggregating the data collected by all the sensing network sub-platforms and sending them to the management platform.

When the embodiments of the present disclosure are implemented, the multiple service sub-platforms obtain one of the first monitoring data, the second monitoring data, the benchmark working parameter and the working state of the target collaborative robot from the management platform, respectively, and are aggregated by the service master platform and sent to the user platform for display. The multiple sensing network sub-platforms obtain one of the first monitoring data and the second monitoring data of the different devices from the production line, and send them to the management platform after being aggregated by the sensing network master platform.

Figure 4:
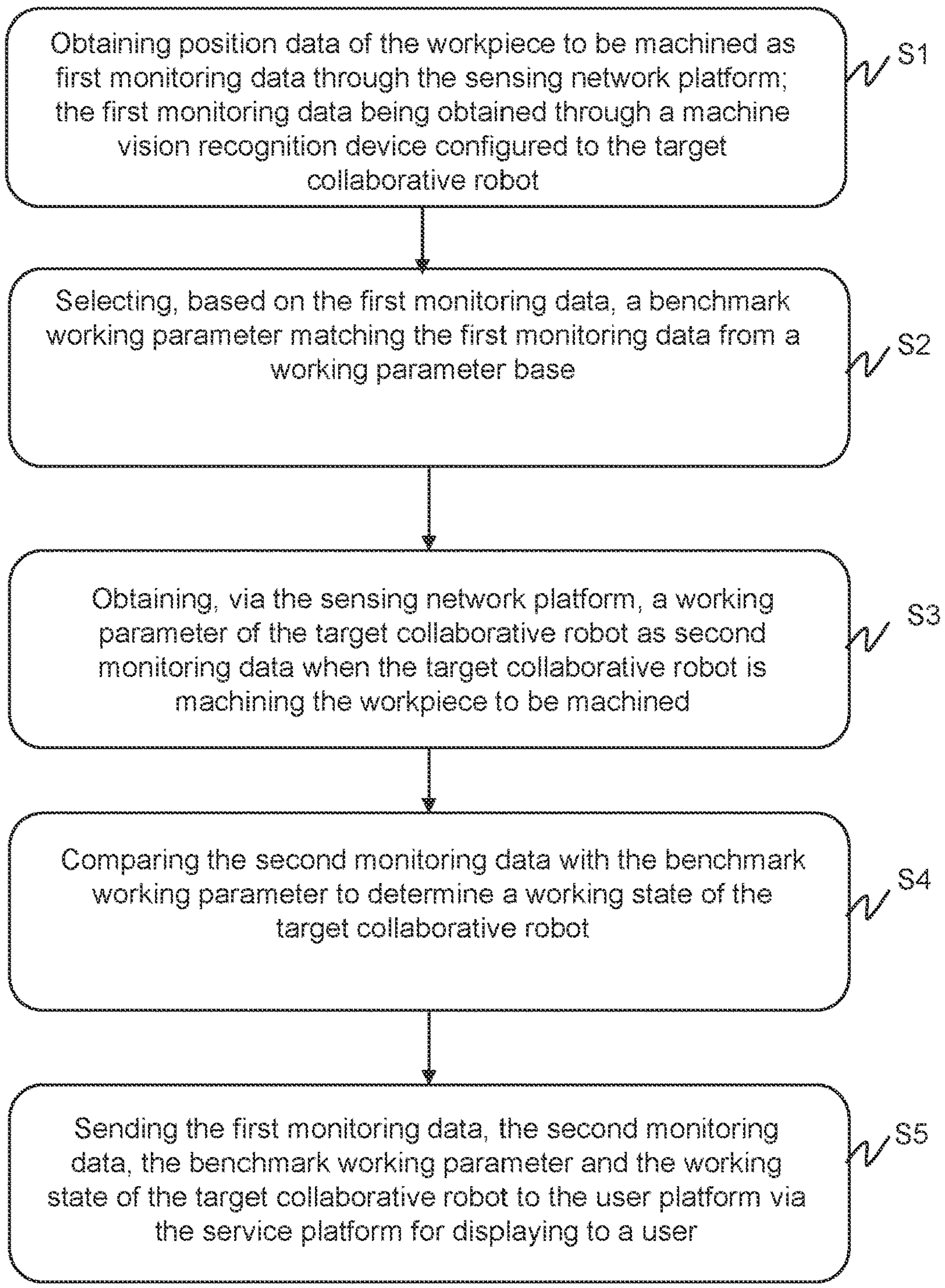
FIG. 4 is a flowchart illustrating another exemplary control method for an industrial Internet of Things for monitoring a collaborative robot, according to some embodiments of the present disclosure.

FIG. 4 is a flowchart illustrating another exemplary control method for an industrial Internet of Things for monitoring a collaborative robot, according to some embodiments of the present disclosure. As shown in FIG. 4, another control method for the industrial Internet of Things for monitoring a collaborative robot may be applied to the industrial Internet of Things for monitoring a collaborative robot as described in FIG. 3. Further, the another control method for the industrial Internet of Things for monitoring a collaborative robot by the management platform, may specifically include the following described in steps S1-step S5.

S1: obtaining position data of the workpiece to be machined as first monitoring data through the sensing network platform; the first monitoring data being obtained through a machine vision recognition device configured to the target collaborative robot;

S2: selecting, based on the first monitoring data, a benchmark working parameter matching the first monitoring data from a working parameter library;

S3: obtaining, via the sensing network platform, a working parameter of the target collaborative robot as second monitoring data when the target collaborative robot is machining the workpiece to be machined;

S4: comparing the second monitoring data with the benchmark working parameter to determine a working state of the target collaborative robot;

S5: sending the first monitoring data, the second monitoring data, the benchmark working parameter and the working state of the target collaborative robot to the user platform via the service platform for displaying to a user.

In one possible implementation, the working parameter library is configured with a correspondence of different monitoring data regions and benchmark working parameters;

the selecting, based on the first monitoring data, a benchmark working parameter matching the first monitoring data from a working parameter library includes:

traversing all the monitoring data regions in the working parameter library and selecting a monitoring data region where the first monitoring data is located;

using the benchmark working parameter corresponding to the selected monitoring data region as a benchmark working parameter matching the first monitoring data.

In one possible implementation, the comparing the second monitoring data with the benchmark working parameter to determine a working state of the target collaborative robot includes:

calculating a residual allowable value based on a position of the first monitoring data in a corresponding monitoring data region, and generate a loss function based on the residual allowable value;

comparing the second monitoring data with the benchmark working parameter according to the loss function.

In one possible implementation, the first monitoring data is a coordinate position of a key region of a workpiece to be machined in a reference coordinate system; the reference coordinate system is a coordinate system established within a field of view of a camera of the machine vision recognition device; the monitoring data region is a working parameter having a similarity above a preset value for the target collaborative robot to process the corresponding workpiece to be machined when the first monitoring data falls into the same monitoring data region; the benchmark working parameter is a working parameter for the target collaborative robot to process the corresponding workpiece to be machined in a normal state when the first monitoring data falls into a central region of the monitoring data region.

Figure 5:
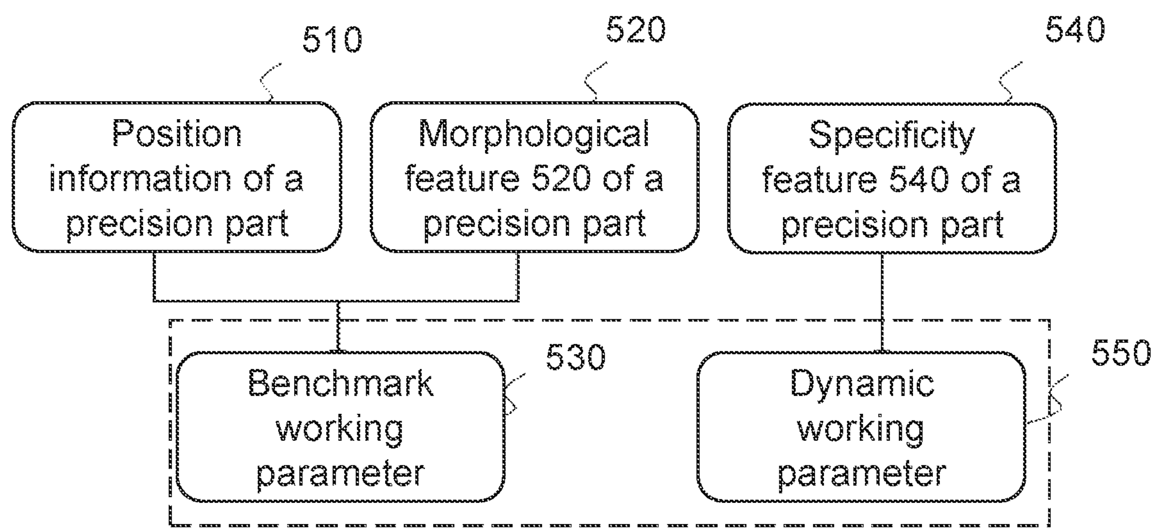
FIG. 5 is a schematic diagram illustrating an exemplary finishing of a precision part according to some embodiments of the present disclosure.

FIG. 5 is a schematic diagram illustrating an exemplary finishing of a precision part according to some embodiments of the present disclosure.

In some embodiments, the comparison module 120 may obtain position information 510 and a morphological feature 520 of a precision part by a machine vision recognition device of the target collaborative robot; and based on the position information 510 and the morphological feature 520, determine a benchmark working parameter 530 for finishing of the precision part by the target collaborative robot. For more information about the target collaborative robot, please refer to FIG. 2 and its related description.

The machine vision recognition device is a device for obtaining data related to a precision part. For example, the machine vision recognition device may include, but is not limited to, a non-contact measurement device; e.g., a two-dimensional measurement instrument, an image measurement instrument, a structured light three-dimensional scanner, etc.

The precision part is a part obtained by finishing. For example, the precision part may be a nut, a gear, etc. obtained by the finishing. The finishing refers to a precision machining. For example, the finishing may include, but is not limited to, precision turning, finishing polishing, grinding, etc. In some embodiments, a machining precision of the finishing may range from 0.1 to 10 μm, a tolerance grade may be above IT5, and a surface roughness Ra may be below 0.1 μm.

The position information of the precision part is also referred to as position data. For more information about the position data, please refer to FIG. 3 and its related description.

The morphological feature of the precision part is a feature related to the morphology of the precision part. For example, the morphological feature of the precision part may include, but is not limited to, a shape, a size, a machined surface condition of the precision part, and a number of precision parts. The machined surface condition refers to a feature related to the surface of the precision part to be machined. For example, the machined surface condition may include, but is not limited to, a shape, an area, a type (e.g., flat, curved, etc.), etc. of the surface to be machined of the precision part.

In some embodiments, the comparison module 120 may obtain the morphological feature of the precision part in a variety of ways. For example, the comparison module 120 may obtain the morphological feature of the precision part by photographing the precision part with a structured light three-dimensional scanner.

The benchmark working parameter is information about a parameter related to the finishing of a precision part. For example, the benchmark working parameter may include, but is not limited to, a cutting speed, a feed, etc.

In some embodiments, the benchmark working parameter may include at least one of a machining intensity and a machining time.

The machining intensity is information about a parameter related to the machining intensity. For example, the machining intensity may be the intensity with which a precision part is ground. In some embodiments, a higher machining intensity represents a higher machining effort and faster machining speed when the precision part is subjected to a finishing.

The machining time is the time used to finish a precision part.

In some embodiments, the comparison module 120 may determine the benchmark working parameter based on the position information and the morphological feature in a variety of ways. For example, the comparison module 120 may determine the benchmark working parameter based on a preset data comparison table from the position information and morphological feature of the precision part. In particular, the preset data comparison table contains benchmark working parameters corresponding to the different position information and morphological features. The preset data comparison table may be obtained based on a priori knowledge or historical data preset.

In some embodiments, the comparison module 120 may determine a working process and a working station in which the precision part is located based on the position information and the morphological feature of the precision part; and determine the benchmark working parameter based on at least one of a precision requirement, a material, a working process of the precision part, a working station in which the precision part is located, and a device feature of the machining device.

The working process refers to a certain machining process. For example, the working process may include, but is not limited to, precision turning, finish polishing, grinding, etc.

The working station is a mounting position where a precision part is subjected to finishing. In some embodiments, one working process may include multiple working stations, and different working stations may be used to machine different machined surfaces of the precision part.

The working process in which the precision part is located is the process in which the precision part is about to be machined. The working station in which the precision part is located is the working station in which the precision part is actually located during the process.

In some embodiments, the comparison module 120 may determine the working process and working station in which the precision part is located based on the position information and morphological feature of the precision part in a variety of ways. For example, the comparison module 120 may determine the working process and working station in which the precision part is located through a working process and working station determination model based on the position information and morphological feature of the precision part. The working process and working station determination model may be a machine learning model. For example, the working process and working station determination model may include one of a neural network (NN) model, a convolutional neural network (CNN) model, or any combination thereof.

The precision requirement is a requirement for the machining precision of a precision part. The machining precision refers to a conformity degree of an actual geometric parameter of the machined precision part to a geometric parameter designed on a drawing. For example, the machining precision may include, but is not limited to, a size precision, a position precision, a shape precision, etc. As another example, the precision requirement may be a size precision error range of ±a mm for a precision part.

The material refers to a type of material of the precision part. For example, the material may include, but is not limited to, steel, aluminum, etc.

In some embodiments, the comparison module 120 may obtain the precision requirement and material of the precision part in a variety of ways. For example, the comparison module 120 may obtain the precision requirement and material of the precision part by manual input. As another example, the precision requirement and material of the precision part may be an advance preset value, a default value, etc., or any combination thereof, which may be determined based on actual needs, without limitation herein.

The machining device refers to an apparatus and equipment assembled on the target collaborative robot for finishing a precision part. For example, the machining device may include, but is not limited to, a tool, a grinding implement, etc., assembled on the target collaborative robot for finishing.

The device feature of the machining device refers to information related to a type and wore condition, etc., of the machining device. For example, the device feature of the machining device may include, but is not limited to, a type, a model, a worn condition, etc. of the machining device.

In some embodiments, the comparison module 120 may obtain the device feature of the machining device in a variety of ways. For example, the comparison module 120 may obtain the device feature of the machining device by accessing to the storage device of the machining device.

In some embodiments, the comparison module 120 may determine the benchmark working parameter based on at least one of the precision requirement, the material of the precision part, the working process and the working station in which it is located, and the device feature of the machining device, in a variety of ways. For example, the comparison module 120 may construct a target vector based on at least one of the precision requirement, the material of the precision part, the working process and the working station in which it is located, and the device feature of the machining device; determine an associated vector through a vector database based on the target vector; and determine a reference benchmark working parameter corresponding to the associated vector as a benchmark working parameter corresponding to the target vector.

The target vector is a vector constructed based on at least one of the precision requirement, the material of the precision part, the working process and the working station in which it is located, and the device feature of the machining device. There may be a variety of ways to construct the target vector. For example, the comparison module 120 may input at least one of the precision requirement, the material of the precision part, the working process and the working station in which it is located, and the device feature of the machining device into an embedding layer for processing to obtain the target vector.

The vector database contains multiple reference vectors, and a corresponding reference benchmark working parameter exists for each of the multiple reference vectors.

The reference vector is a vector constructed based on at least one of a historical precision requirement, a historical material of the precision part, a historical working process and working station in which it is located, and a historical device feature of the machining device when finishing the precision part in a historical time period, the reference vector corresponds to the reference benchmark working parameter which may be a historical benchmark working parameter corresponding to the historical time period when the finishing of the precision part is better. The reference vector may be constructed in the manner described above for the construction of the target vector.

In some embodiments, the comparison module 120 may separately calculate a vector distance between the target vector and the reference vector to determine the benchmark working parameter of the target vector. For example, the reference vector whose vector distance from the target vector meets a preset condition is used as the associated vector, and the reference benchmark working parameter corresponding to the associated vector is used as the benchmark working parameter corresponding to the target vector. The preset condition may be set according to the situation. For example, the preset condition may be that the vector distance is minimum or the vector distance is less than a distance threshold, etc. The vector distance may include, but is not limited to, a cosine distance, a Marxian distance, a Euclidean distance, etc.

In some embodiments of the present disclosure, the benchmark working parameter is determined while considering the precision requirement, the material of the precision part, the working process and the working station in which it is located, and the device feature of the machining device, so that the target collaborative robot is conducive to improving the quality of the precision part when finishing the precision part according to the benchmark working parameter.

In some embodiments, the comparison module 120 may obtain a specificity feature 540 of the precision part; and determine a dynamic working parameter 550 based on the specificity feature.

The specificity feature of the precision part is a feature that relates to an actual form of each precision part. For example, the specificity feature of the precision part may include, but is not limited to, a surface macro image, a machining allowance, size data, etc. of each precision part after machining by a previous process.

In some embodiments, the specificity feature may include precision parameter distribution information after machining by the previous process.

The precision parameter distribution information refers to an actual precision parameter of each machined surface of each precision part. The precision parameter is information about a parameter related to the precision of the precision part. For example, the precision parameter may include, but is not limited to, a machining precision, a tolerance grade, a surface roughness, etc. For more information about the machining precision, please refer to the previous related description.

In the actual machining process, various factors (e.g., a tool difference, a temperature difference, a difference in the material itself, etc.) lead to different precision parameters for each precision part after machining, and even different precision parameters for different positions of the same precision part. Therefore, it is beneficial to improve the quality of precision parts by considering the precision parameter distribution information of the machined precision parts and adjusting the machining parameters in a targeted manner.

In some embodiments, the comparison module 120 may obtain the specificity feature of each precision part in a variety of ways. For example, the comparison module 120 may obtain the specificity feature of each precision part by measuring each precision part with a profilometer.

The dynamic working parameter is information related to an actual machining parameter of each precision part. For example, the dynamic working parameter may include, but is not limited to, an actual cutting speed, an actual feed, etc. for each precision part.

In some embodiments, the dynamic working parameter may include at least a dynamic machining time length.

The dynamic machining time length is a time length when each precision part is machined.

In some embodiments, the comparison module 120 may determine the dynamic working parameter based on the specificity feature in a variety of ways. For example, the comparison module 120 may determine the dynamic working parameter based on a preset data comparison table based on the specificity feature of the precision part. The preset data comparison table contains the dynamic working parameter corresponding to each specificity feature of the precision part. The preset data comparison table may be obtained based on a priori knowledge or historical data.

In some embodiments, the comparison module 120 may determine a specificity machining point position based on the precision parameter distribution information after the previous process of the precision part and the reference precision of the previous process; based on the precision parameter of the specificity machining point position, the dynamic machining time length is determined by a precision prediction model. For more information about the precision prediction model, please refer to FIG. 6 and its related description. For more information about the precision parameter distribution information, please refer to the description above.

The reference precision refers to a reference machining precision of a precision part that has been machined by a previous process. For example, the reference precision may include, but is not limited to, a reference size precision, a reference position precision, a reference shape precision, etc.

In some embodiments, the comparison module 120 may obtain the reference precision in a variety of ways. For example, the comparison module 120 may sum the machining precisions of all precision parts in the historical data that meet the accuracy requirements after being machined in the previous process to obtain the reference precision.

The specificity machining point position is an area on the precision part that requires adjustment of the reference working parameter for finishing. For example, the specificity point position may include a part on the precision part that requires adjustment of the benchmark working parameter for finish polishing.

In some embodiments, the comparison module 120 may determine the specificity machining point position based on the precision parameter distribution information after the previous process of the precision part and the reference precision of the previous process in a variety of ways. For example, the comparison module 120 may determine the specificity machining point position based on the preset data comparison table by using the precision parameter distribution information after the previous process of the precision part and the reference accuracy of the previous process. In this case, the preset data comparison table contains different precision parameter distribution information after the previous process of the precision part and different reference precisions of the previous process corresponding to the specific machining point positions. The preset data comparison table may be obtained based on a priori knowledge or historical data.

In some embodiments, the comparison module 120 may determine whether a difference between the precision parameter distribution information of the precision part after the previous process and the reference precision of the previous process meets a preset condition; in response thereto, the part that meets the preset condition is identified as a specificity machining point position. For example, the comparison module 120 may, for different parts of the precision part, determine whether the difference between the accuracy parameter distribution information of the part after the previous process and the reference precision of the previous process meets the preset condition, and determine the part that meets the preset condition as the specificity machining point position.

In some embodiments, the preset condition may include a difference between the precision parameter distribution information of the precision part after the previous process and the reference precision of the previous process being greater than a difference threshold.

The difference threshold is a threshold condition related to a difference value of a precision part that is the difference between the precision parameter distribution information after the previous process and the reference precision of the previous process. For example, the difference threshold may be a default value, an empirical value, an advance preset value, etc., or any combination thereof, which may be determined based on actual experience and is not limited herein.

In some embodiments, the difference threshold may be related to a surface area of the part and a usage fit requirement. For example, the smaller the surface area of the part is and the higher the usage fit requirement is, the smaller the difference threshold is.

The usage fit requirement is a requirement degree of the quality of the precision part when the precision part is used together with other parts. The usage fit requirement may be expressed as a real number between 0 and 1. The larger the value is, the higher the requirement degree of the quality of the precision part is when used with other parts.

In some embodiments, the comparison module 120 may obtain the usage fit requirement in a variety of ways. For example, the usage fit requirement may be an empirical value, a default value, an advance preset value, etc., or any combination thereof, which may be determined based on actual needs, without limitation herein.

In some embodiments, the usage fit requirement may be determined based on a material strength, a precision parameter, and a force feature of the other parts that the part contacts when assembled to the complete machine. For example, the greater the material strength is, the higher the precision parameter is, and the more complex the force feature is of the other parts that the precision part contacts, the greater the usage fit requirement for that precision part. For more information about the precision parameter, please refer to the previous section.

The material strength refers to the magnitude of a material's ability to resist fracture and excessive deformation. For example, the material strength may include, but is not limited to, a tensile strength, a yield strength, etc. In some embodiments, a material is strong if the material has a tensile strength greater than a first strength threshold or a yield strength greater than a second strength threshold. The first strength threshold and the second strength threshold may be empirical values, default values, advance preset values, etc. or any combination thereof, which may be determined based on actual needs.

The force feature is a feature that relates to the force applied to the precision part when it is used on the entire machine. For example, the force feature may include, but is not limited to, a magnitude of force on the precision part and a direction of force, etc. In some embodiments, the force feature is complex if the precision part is subjected to forces of different magnitudes in multiple directions at the same time.

In some embodiments, the comparison module 120 may determine the usage fit requirement based on the material strength, the precision parameter, and the force feature of the other parts contacted when the part is assembled to the complete machine in a variety of ways. For example, the comparison module 120 may determine the usage fit by using a fit determination model to process the material strength, the precision parameter, and the force feature of the other parts contacted when the part is assembled to the complete machine. The usage fit determination model may be a machine learning model. For example, the fit determination model may include one of a neural network (NN) model, a convolutional neural network (CNN) model, or any combination thereof.

In some embodiments of the present disclosure, the higher the use fit requirement of the precision part is, the smaller the surface area (when subjected to the same magnitude of force is, the smaller the surface area is, the larger the pressure is), the higher the design requirement and quality control requirement is, and setting the difference threshold value smaller can effectively control the machining quality of the precision part and ensure its normal use in the whole machine.

In some embodiments, the comparison module 120 may send the benchmark working parameter 530 and the dynamic working parameter 550 to the user platform for display. For more information about the user platform, please refer to FIG. 3 and its related description.

In some embodiments of the present disclosure, the dynamic working parameter of the target collaborative robot for machining each part is determined based on the specificity feature of each precision part, which enables fine-tuning of its machining parameters for different machining allowance, surface roughness, and other information of each part, which is conducive to improving the quality and qualification rate of the precision part.

Figure 6:
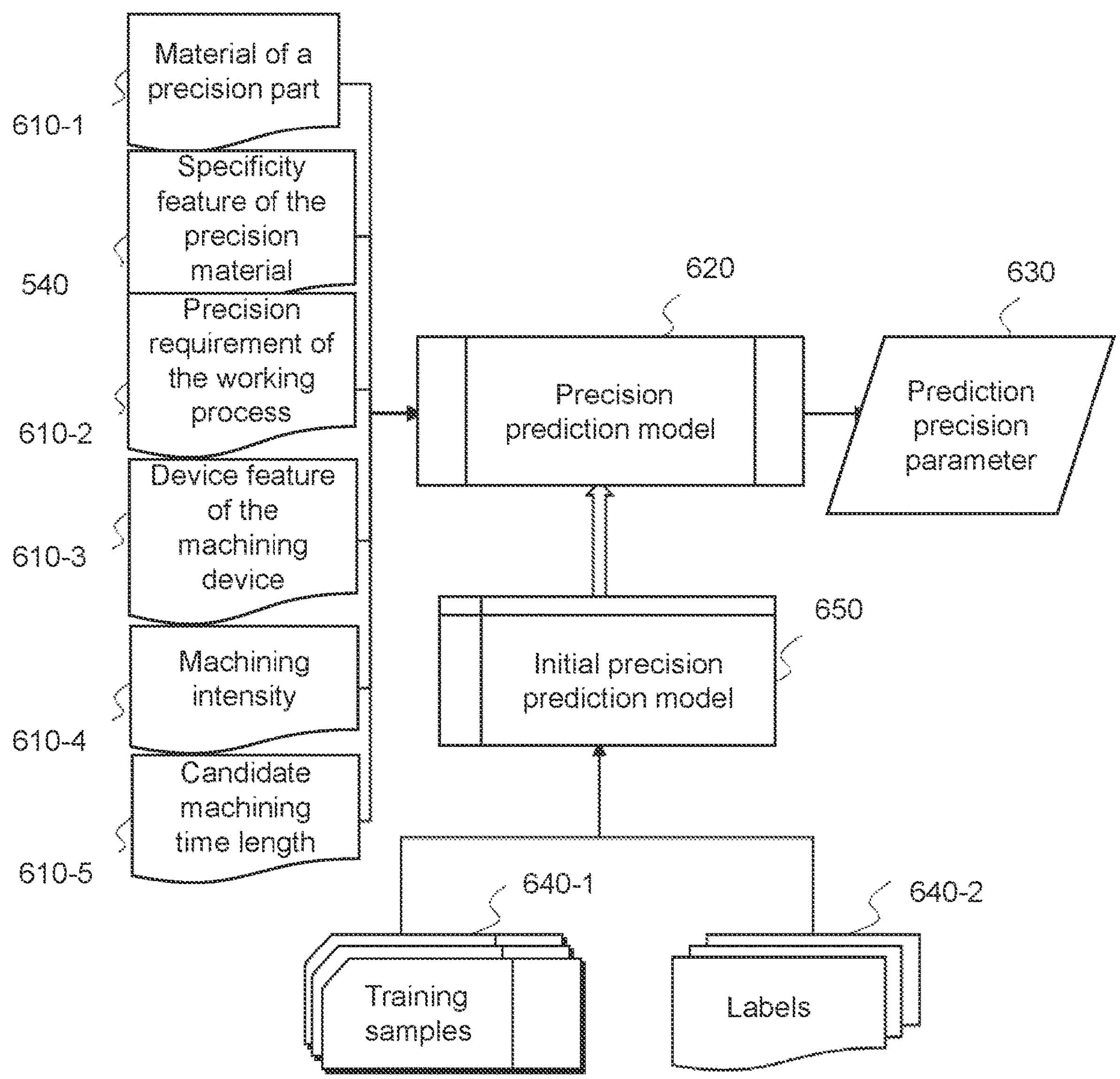
FIG. 6 is a schematic diagram illustrating an exemplary precision prediction model according to some embodiments of the present disclosure.

FIG. 6 is a schematic diagram illustrating an exemplary precision prediction model according to some embodiments of the present disclosure.

The precision prediction model 620 may be a machine learning model for determining a prediction precision parameter. For example, the precision prediction model 620 may include one of a neural network (NN) model, a convolutional neural network (CNN) model, or any combination thereof.

In some embodiments, an input of the precision prediction model 620 may include a material 610-1 of the precision part, a specificity feature 540 of the precision material, a precision requirement 610-2 of the working process, a device feature 610-3 of the machining device, a machining intensity 610-4, and a candidate machining time length 610-5; an output may include a prediction precision parameter 630. For more information about the material of the precision part, the specificity feature of the precision material, the precision requirement of the working process, the device feature of the machining device, and the machining intensity, please refer to FIG. 5 and its related description.

The candidate machining time length is an initially determined machining time length of the precision part.

In some embodiments, the comparison module 120 may determine the candidate machining time length in a variety of ways. For example, the comparison module 120 may add a time length to the machining time in the benchmark working parameter to obtain the candidate machining time length. A size of the time length may be an empirical value, a default value, a preset value in advance, etc. or any combination thereof, which may be determined according to actual needs and is not limited herein. As another example, the comparison module 120 may determine the candidate machining time length based on the preset data comparison table from the machining time in the benchmark working parameter. In this case, the candidate machining time lengths corresponding to different machining times are recorded in the preset data comparison table. The preset data comparison table may be obtained based on a priori knowledge or historical data presets. For more information about the machining time length, please refer to FIG. 5 and its related description.

In some embodiments of the present disclosure, since the specificity machining point position of the precision part may have burrs, defects, etc., resulting in a larger tolerance level, surface roughness, etc. in the precision parameter of the part, a longer machining time may be required compared to the machining time in the benchmark working parameter, and the use of increasing the time length directly on top of the machining time in the benchmark working parameter and identifying it as a candidate machining time can reduce the computing pressure and computing time of the precision prediction model.

In some embodiments, as each working process has multiple working stations, each working station processes one machining surface of a precision part. Thus, an input of the precision prediction model 620 may include a candidate machining time length corresponding to a working station or a machining face; an output may include a prediction precision parameter corresponding to that working station or that machining face. The input of the precision prediction model 620 may also include a candidate machining time length vector corresponding to a working process; the output may include a prediction precision parameter vector corresponding to that working process. Each element of the candidate machining time length vector corresponds to a candidate machining time length for a working station or a machining surface, and each element of the prediction precision parameter vector corresponds to a prediction precision parameter for a working station or a machining surface.

The prediction precision parameter is information about a prediction parameter related to the precision of a precision part. The prediction precision parameter may include, but is not limited to, a predicted machining precision, a predicted tolerance grade, a predicted surface roughness, etc.

In some embodiments, the comparison module 120 may determine the dynamic machining time length based on the prediction accuracy parameter in a variety of ways. For example, the comparison module 120 may use a minimum value of a candidate machining time length corresponding to a prediction accuracy parameter that meets the precision requirement of the process as the dynamic machining time length. For more information about the dynamic machining time length, please refer to FIG. 5 and its related description.

In some embodiments, the precision prediction model 620 may be obtained by training multiple training samples 640-1 with labels 640-2. For example, the multiple training samples 640-1 with labels 640-2 may be input into an initial precision prediction model 650, a loss function is constructed from the results of the labels 640-2 and the initial precision prediction model 650, and the parameters of the initial precision prediction model 650 are updated based on the loss function iteratively. When the loss function of the initial precision prediction model 650 meets an iterative preset condition, the model training is completed and the trained precision prediction model 620 is obtained. The iterative preset condition may be a loss function convergence, a number of iterations reaching a threshold, etc.

In some embodiments, the training samples 640-1 may include sample materials, sample specificity features, sample precision requirements for each working process, device features of sample machining devices, sample machining intensity, and sample candidate machining time lengths for finishing machining of parts of different materials.

The labels may be the sample precision parameters of the sample precision parts corresponding to the group of samples. In some embodiments, the training samples may be obtained based on historical data (e.g., historical material of the precision part, historical specificity features, historical precision requirements for each process, historical device features of the machining devices, historical machining intensity, and historical candidate machining time lengths), and the labels 640-2 may be obtained by measuring the precision part obtained by finishing in the historical time period.

As can be seen in the present disclosure, numerous features may reflect, to some extent, the precision parameter of the precision part after machining. However, many times some features do not have values that are effectively capable of producing an effect, and many times the available feature values are not sufficient to determine the precision parameter after machining of the precision part, either alone or by simple rules. Therefore, using the precision prediction model, it is possible to determine the precision parameter after machining the precision part based on a large number and wide range of features, breaking the traditional rule-based limitations. Rule-based approaches are limited by their complexity, can only be based on a relatively small number of features, and are limited by artificially prescribed rules. In contrast, prediction based on machine learning techniques can be trained based on more and richer features, which can lead to higher accuracy of the prediction precision parameter after machining of the precision part.

The basic concepts have been described above, apparently, in detail, as will be described above, and does not constitute limitations of the disclosure. Although there is no clear explanation here, those skilled in the art may make various modifications, improvements, and modifications of present disclosure. This type of modification, improvement, and corrections are recommended in present disclosure, so the modification, improvement, and the amendment remain in the spirit and scope of the exemplary embodiment of the present disclosure.

At the same time, present disclosure uses specific words to describe the embodiments of the present disclosure. As “one embodiment”, “an embodiment”, and/or “some embodiments” means a certain feature, structure, or characteristic of at least one embodiment of the present disclosure. Therefore, it is emphasized and should be appreciated that two or more references to “an embodiment” or “one embodiment” or “an alternative embodiment” in various parts of present disclosure are not necessarily all referring to the same embodiment. Further, certain features, structures, or features of one or more embodiments of the present disclosure may be combined.

Moreover, unless the claims are clearly stated, the sequence of the present disclosure, the use of the digital letters, or the use of other names is not configured to define the order of the present disclosure processes and methods. Although some examples of the disclosure currently considered useful in the present disclosure are discussed in the above disclosure, it should be understood that the details will only be described, and the appended claims are not limited to the disclosure embodiments. The requirements are designed to cover all modifications and equivalents combined with the substance and range of the present disclosure. For example, although the implementation of various components described above may be embodied in a hardware device, it may also be implemented as a software only scheme, e.g., an installation on an existing server or mobile device.

Similarly, it should be noted that in order to simplify the expression disclosed in the present disclosure and help the understanding of one or more embodiments, in the previous description of the embodiments of the present disclosure, a variety of features are sometimes combined into one embodiment, drawings or description thereof. However, this disclosure method does not mean that the characteristics required by the object of the present disclosure are more than the characteristics mentioned in the claims. Rather, claimed subject matter may lie in less than all features of a single foregoing disclosed embodiment.

In some embodiments, numbers expressing quantities of ingredients, properties, and so forth, configured to describe and claim certain embodiments of the application are to be understood as being modified in some instances by the term “about,” “approximate,” or “substantially”. Unless otherwise stated, “approximately”, “approximately” or “substantially” indicates that the number is allowed to vary by ±20%. Accordingly, in some embodiments, the numerical parameters used in the specification and claims are approximate values, and the approximate values may be changed according to characteristics required by individual embodiments. In some embodiments, the numerical parameters should be construed in light of the number of reported significant digits and by applying ordinary rounding techniques. Although the numerical domains and parameters used in the present disclosure are configured to confirm its range breadth, in the specific embodiment, the settings of such values are as accurately as possible within the feasible range.

For each patent, patent application, patent application publication and other materials referenced by the present disclosure, such as articles, books, instructions, publications, documentation, etc., hereby incorporated herein by reference. Except for the application history documents that are inconsistent with or conflict with the contents of the present disclosure, and the documents that limit the widest range of claims in the present disclosure (currently or later attached to the present disclosure). It should be noted that if a description, definition, and/or terms in the subsequent material of the present disclosure are inconsistent or conflicted with the content described in the present disclosure, the use of description, definition, and/or terms in this manual shall prevail.

Finally, it should be understood that the embodiments described herein are only configured to illustrate the principles of the embodiments of the present disclosure. Other deformations may also belong to the scope of the present disclosure. Thus, as an example, not limited, the alternative configuration of the present disclosure embodiment may be consistent with the teachings of the present disclosure. Accordingly, the embodiments of the present disclosure are not limited to the embodiments of the present disclosure clearly described and described.

What is claimed is:

1. An industrial Internet of things system for monitoring a collaborative robot, including a service platform, a management platform and a sensing network platform connected in sequence, wherein the management platform includes:

a first acquisition unit configured to obtain position data of a workpiece to be machined as first monitoring data through the sensing network platform; the first monitoring data being obtained through a machine vision recognition device configured in a target collaborative robot;

a matching unit configured to select, based on the first monitoring data, a benchmark working parameter matching the first monitoring data from a working parameter library, the benchmark working parameter being a benchmark that should appear in the target collaborative robot when the position data of the workpiece to be machined is in the first monitoring data in a normal working condition;

a second acquisition unit configured to obtain, via the sensing network platform, a working parameter of the target collaborative robot as second monitoring data when the target collaborative robot is machining the workpiece to be machined;

a comparison unit configured to compare the second monitoring data with the benchmark working parameter to determine a working state of the target collaborative robot;

a communication module configured to send the first monitoring data, the second monitoring data, the benchmark working parameter and the working state of the target collaborative robot to the user platform via the service platform for displaying to a user;

wherein the working parameter library is configured with a correspondence of different monitoring data regions and benchmark working parameters;

the matching unit is further configured to:

traverse all the monitoring data regions in the working parameter library and select a monitoring data region where the first monitoring data is located; and use the benchmark working parameter corresponding to the selected monitoring data region as a benchmark working parameter matching the first monitoring data; and the comparison unit is further configured to:

calculate a residual allowable value based on a position of the first monitoring data in a corresponding monitoring data region, and generate a loss function based on the residual allowable value; and compare the second monitoring data with the benchmark working parameter according to the loss function.

2. The industrial Internet of things system of claim 1, wherein the first monitoring data is a coordinate position of a key region of a workpiece to be machined in a reference coordinate system; the reference coordinate system is a coordinate system established within a field of view of a camera of the machine vision recognition device; the monitoring data region is a working parameter having a similarity above a preset value for the target collaborative robot to process the workpiece to be machined when the first monitoring data falls into the same monitoring data region; the benchmark working parameter is a working parameter for the target collaborative robot to process the workpiece to be machined in a normal state when the first monitoring data falls into a central region of the monitoring data region.

3. The industrial Internet of things system of claim 2, wherein the comparison unit is further configured to:

obtain a first center coordinate value of the first monitoring data and obtain a second center coordinate value of the monitoring data region; the first center coordinate value being a coordinate of a center point of position data of the workpiece to be machined in the reference coordinate system; the second center coordinate value being a coordinate of a center point of a center region of the monitoring data region in the reference coordinate system;

calculate a physical distance between the first center coordinate value and the second center coordinate value and input the physical distance into a permissive residual model to generate the residual allowable value.

4. The industrial Internet of things system of claim 1, wherein the service platform includes a service master platform and at least two service sub-platforms, different service sub-platforms being used to receive different types of data transmitted by the management platform; the service master platform aggregating the data collected by all the service sub-platforms and sending them to the user platform for presentation to the user;

the management platform includes multiple mutually independent management sub-platforms, the first acquisition unit, the matching unit, the second acquisition unit, the comparison unit and the communication module being configured in the same management sub-platform;

the sensing network platform includes a sensing network master platform and at least two sensing network sub-platforms, different sensing network sub-platforms being used to receive different types of data on a production line; the sensing network master platform aggregating the data collected by all the sensing network sub-platforms and sending them to the management platform.

5. An industrial Internet of Things control method for monitoring a collaborative robot applied to the industrial Internet of Things system of claim 1, wherein the industrial Internet of Things control method is executed by the management platform and comprises:

obtaining the position data of the workpiece to be machined as the first monitoring data through the sensing network platform; the first monitoring data being obtained through the machine vision recognition device configured in the target collaborative robot;

selecting, based on the first monitoring data, the benchmark working parameter matching the first monitoring data from the working parameter library;

obtaining, via the sensing network platform, the working parameter of the target collaborative robot as the second monitoring data when the target collaborative robot is machining the workpiece to be machined;

comparing the second monitoring data with the benchmark working parameter to determine the working state of the target collaborative robot;

sending the first monitoring data, the second monitoring data, the benchmark working parameter and the working state of the target collaborative robot to the user platform via the service platform for displaying to a user.

6. The industrial Internet of Things control method of claim 5, wherein the working parameter library is configured with a correspondence of different monitoring data regions and benchmark working parameters;

the selecting, based on the first monitoring data, the benchmark working parameter matching the first monitoring data from the working parameter library includes:

traversing all the monitoring data regions in the working parameter library and selecting a monitoring data region where the first monitoring data is located; and using the benchmark working parameter corresponding to the selected monitoring data region as a benchmark working parameter matching the first monitoring data.

7. The industrial Internet of Things control method of claim 6, wherein the comparing the second monitoring data with the benchmark working parameter to determine the working state of the target collaborative robot includes:

calculating a residual allowable value based on a position of the first monitoring data in a corresponding monitoring data region, and generating a loss function based on the residual allowable value;

comparing the second monitoring data with the benchmark working parameter according to the loss function.

8. The industrial Internet of Things control method of claim 7, wherein the first monitoring data is a coordinate position of a key region of a workpiece to be machined in a reference coordinate system; the reference coordinate system is a coordinate system established within a field of view of a camera of the machine vision recognition device; the monitoring data region is a working parameter having a similarity above a preset value for the target collaborative robot to process the workpiece to be machined when the first monitoring data falls into the same monitoring data region; the benchmark working parameter is a working parameter for the target collaborative robot to process the workpiece to be machined in a normal state when the first monitoring data falls into a central region of the monitoring data region.

* * * * *